US012663847B2

(12) United States Patent
Lombardi et al.

(10) Patent No.: US 12,663,847 B2
(45) Date of Patent: Jun. 23, 2026

(54) WIRELESS CHARGING THROUGH A DISPLAY

(71) Applicant: Google LLC, Mountain View, CA (US)

(72) Inventors: Michael J. Lombardi, South Barrington, IL (US); Joe Allore, Mundelein, IL (US); Jae-Won Hwang, Menlo Park, CA (US); Mark Mienko, San Jose, CA (US); Veera Venkata Siva Nagesh Polu, Mountain View, CA (US)

(73) Assignee: Google LLC, Mountain View, CA (US)

( * ) Notice: Subject to any disclaimer, the term of this patent is extended or adjusted under 35 U.S.C. 154(b) by 156 days.

(21) Appl. No.: 18/294,508

(22) PCT Filed: Nov. 4, 2021

(86) PCT No.: PCT/US2021/058059
§ 371 (c)(1),
(2) Date: Feb. 1, 2024

(87) PCT Pub. No.: WO2023/080893
PCT Pub. Date: May 11, 2023

(65) Prior Publication Data
US 2025/0103116 A1       Mar. 27, 2025

(51) Int. Cl.
| *G06F 1/26* | (2006.01) |
| *H02J 7/82* | (2026.01) |
| *H02J 50/00* | (2016.01) |
| *H02J 50/10* | (2016.01) |
| *H02J 50/40* | (2016.01) |
| *H02J 50/70* | (2016.01) |

(52) U.S. Cl.
CPC ............... *G06F 1/263* (2013.01); *H02J 7/82* (2026.01); *H02J 50/005* (2020.01); *H02J 50/10* (2016.02); *H02J 50/40* (2016.02); *H02J 50/70* (2016.02)

(58) Field of Classification Search
None
See application file for complete search history.

(56) References Cited

U.S. PATENT DOCUMENTS

| 10,072,947 | B1 * | 9/2018 | Mantler | ................... | G01B 7/31 |
| 2013/0088192 | A1 * | 4/2013 | Eaton | ....................... | H02J 7/00 |
| | | | | | 320/108 |
| 2016/0094076 | A1 * | 3/2016 | Kasar | ................... | H02J 7/0042 |
| | | | | | 320/103 |
| 2017/0170678 | A1 | 6/2017 | Uhm | | |
| 2017/0179749 | A1 * | 6/2017 | Mansour | ................ | H02J 50/10 |
| 2019/0243477 | A1 * | 8/2019 | Hou | ....................... | G06F 3/0416 |
| 2019/0312451 | A1 * | 10/2019 | An | ....................... | G06F 1/1652 |

(Continued)

FOREIGN PATENT DOCUMENTS

| CN | 20952608 U | 10/2019 |

OTHER PUBLICATIONS

International Search Report and Written Opinion of International Application No. PCT/US2021/058059 dated Jul. 22, 2022, 11 pp.

*Primary Examiner* — Danny Chan
(74) *Attorney, Agent, or Firm* — Shumaker & Sieffert, P.A.

(57) ABSTRACT

An example mobile computing device includes a display; a battery; a wireless charging coil positioned to wirelessly transmit or receive electrical energy through the display; and circuitry configured to charge the battery using electrical energy received via the wireless charging coil.

7 Claims, 8 Drawing Sheets

(56)      References Cited

U.S. PATENT DOCUMENTS

| | | | |
|---|---|---|---|
| 2020/0204666 A1 | 6/2020 | Hong | |
| 2020/0373784 A1 | 11/2020 | Chanhun et al. | |
| 2021/0013738 A1 | 1/2021 | Mansour et al. | |
| 2021/0066641 A1 | 3/2021 | Ai et al. | |
| 2021/0210986 A1 | 7/2021 | Changyu et al. | |
| 2021/0408826 A1* | 12/2021 | Liu | G06F 1/266 |
| 2023/0044815 A1* | 2/2023 | Corwin | H05B 6/1263 |
| 2023/0269313 A1* | 8/2023 | Chang | G06F 1/1683 |
| | | | 455/572 |

* cited by examiner

FIGS. 2A and 2B Legend
200: Folding device
204: External display
206: Shielding layer
208: Wireless charging coil
210: Air gap
214: Circuitry
216: Battery
220: First assembly
222: Second assembly
224: Cover glass
226: Continuous display
228: Rear cover

200

Fully closed

Fully open

FIGS. 4A-4C Legend
400: Folding device
402: External device
404: External display
420: First assembly
422: Second assembly
426: Continuous display
430: Camera
450: Location of a wireless charging coil on the backside of the first assembly (indicated by a dashed line)
452: Location of a wireless charging coil on the first assembly FIGS. 5A and 5B Legend
500: Mobile computing device
502: External device
504: Display
506: Shielding layer
508: Wireless charging coil
512: Section of the shielding layer
514: Circuitry
516: Battery

WIRELESS CHARGING THROUGH A DISPLAY

BACKGROUND

Computing devices, such as smartphones, laptops, wearable devices, and tablets, may include wireless charging capabilities. Computing devices may operate as wireless charging source devices that wirelessly provide power or wireless charging sink devices that wirelessly receive power. Current implementations utilize wireless charging coils that wirelessly transmit/receive power through a rear of a device and are covered by non-metallic cosmetic outer components (e.g., rear glass or rear plastic housing).

SUMMARY

In general, aspects of this disclosure are directed to mobile computing devices that are configured to perform wireless charging through displays. A mobile computing device may include a display on a first surface (e.g., a top) and a wireless charging coil. In some examples, the wireless charging coil may be configured to perform wireless charging through a surface opposite to the first surface (e.g., perform wireless charging through a bottom or non-display side) of the mobile computing device. However, in some examples, such an arrangement may not be desirable. As one example, it may be desirable for a mobile computing device to wirelessly receive power (e.g., operate as a wireless charging sink device) without having a display of the mobile computing device face up (e.g., to avoid distractions or room illumination from the display). As another example, it may be desirable for a mobile computing device to wirelessly provide power (e.g., operate as a wireless charging source device) without having to place the mobile computing device with the display down.

In accordance with one or more aspects of this disclosure, a mobile computing device may include a display on a first surface (e.g., a top) and a wireless charging coil configured to perform wireless charging through the display. As one example, while the mobile computing device is placed display down on a wireless charging pad, the wireless charging coil of the mobile computing device may wirelessly receive power from the wireless charging pad through the display. One or more components of the display may be modified to enable through-display wireless charging. For instance, a section of a metallic shielding layer of the display may be cutout (e.g., a section overlying the wireless charging coil). In this way, a mobile computing device may perform through-display wireless charging.

In one example, a mobile computing device includes a display; a battery; a wireless charging coil positioned to wirelessly transmit or receive electrical energy through the display; and circuitry configured to charge the battery using electrical energy received via the wireless charging coil.

In another example, a method for performing through-display wireless charging includes responsive to detecting, by a device, presence of an external device to perform wireless charging through a display of the device: adjusting, by the device, operation of the display: and performing, by a wireless charging coil of the device that is located under the display, wireless charging through the display.

The details of one or more examples are set forth in the accompanying drawings and the description below. Other features, objects, and advantages of the disclosure will be apparent from the description and drawings, and from the claims.

DETAILED DESCRIPTION

Figures 1A, 1B:
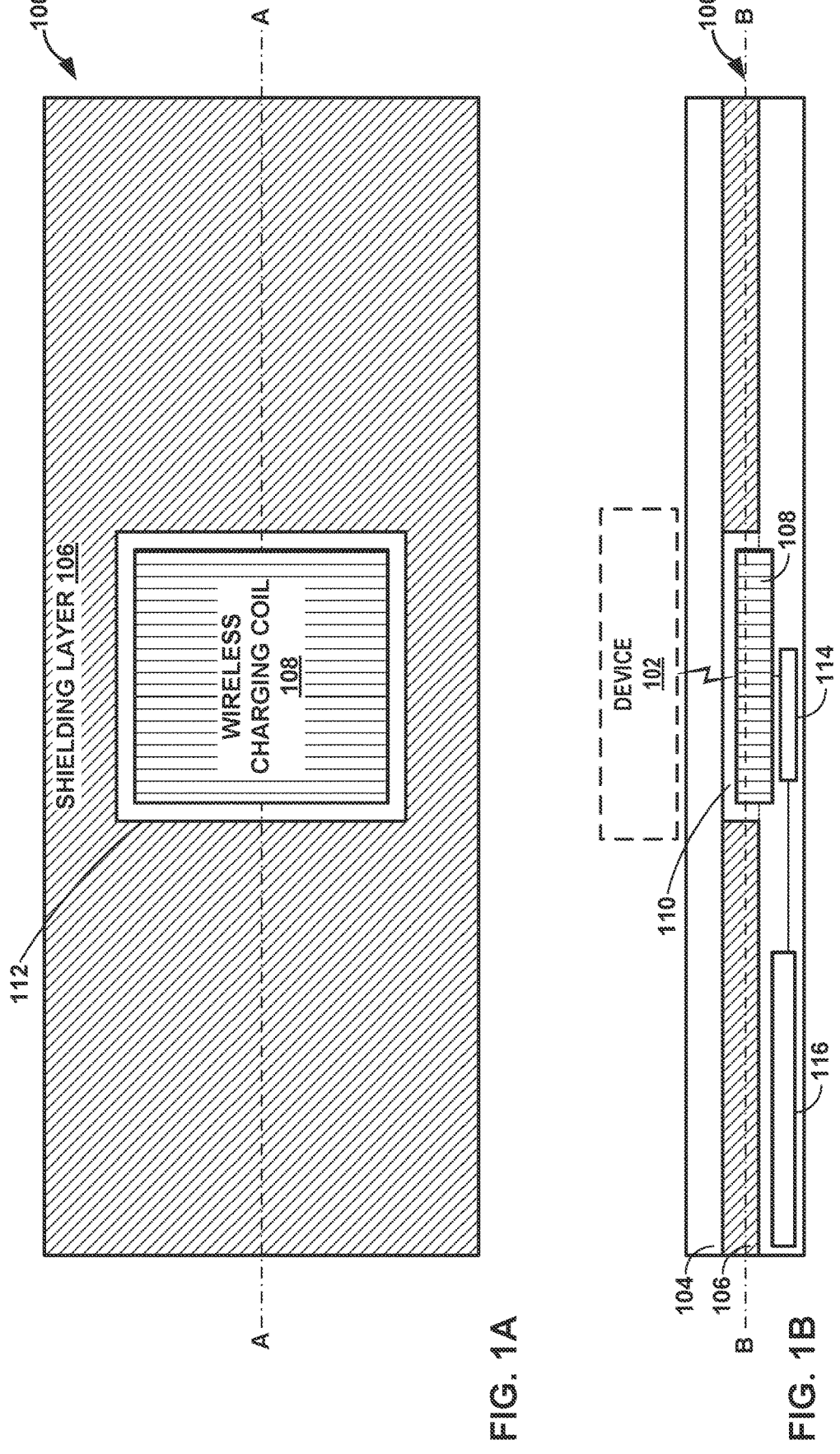
FIGS. 1A and 1B are schematic diagrams illustrating views of a mobile computing device configured to perform through-display wireless charging, in accordance with one or more aspects of this disclosure.

FIGS. 1A and 1B are schematic diagrams illustrating views of a mobile computing device configured to perform through-display wireless charging, in accordance with one or more aspects of this disclosure. FIG. 1A is a top view of mobile computing device 100 cross-sectioned along line B-B. FIG. 1B is a side view of mobile computing device 100 cross-sectioned along line A-A. Examples of mobile computing device 100 include smart phones, tablets, laptops, televisions, e-readers, gaming systems, or any other mobile computing device that includes a display. In some examples, as discussed in further detail below, mobile computing device 100 may be a folding device. For instance, mobile computing device 100 may be a foldable smart phone, a foldable tablet, a foldable e-reader, a foldable gaming system, or any other foldable portable device that includes a display. As shown in FIGS. 1A and 1B, mobile computing device 100 may include display 104, shielding layer 106, wireless charging coil 108, circuitry 114, and battery 116.

Display 104 may be capable of rendering data into images viewable by a user of mobile computing device 100. For example, display 104 may include a matrix of pixels that are individually controllable. Examples of display 104 include, but are not limited to, liquid crystal displays (LCD), light emitting diode (LED) displays, organic light-emitting diode (OLED) displays, micro light-emitting diode (microLED) displays, or similar monochrome or color displays capable of outputting visible information to a user of mobile computing device 100.

Shielding layer 106 may be a metallic shielding layer configured to provide electromagnetic (EM) shielding. Shielding layer 106 may protect display 104 from electromagnetic interference (EMI), electrostatic discharge (ESD), and/or limit the amount of EMI produced by display 104.

Shielding layer 106 may provide a ground reference (e.g., for one or more wireless communication antennas of mobile computing device 100). Shielding layer 106 may be affixed to display 104 using any suitable technique, such as adhesive.

Wireless charging coil 108 may be configured to transduce between magnetic fields and electrical current. As one example, where mobile computing device 100 operates as a wireless charging source, wireless charging coil 108 may operate as a transmitter Tx coil that generates a magnetic field proportional to an electrical signal flowing through wireless charging coil 108. As another example, where mobile computing device 100 operates as a wireless charging sink, wireless charging coil 108 may operate as a receiver Rx coil that generates an electrical signal proportional to a magnetic field at wireless charging coil 108. In some examples, wireless charging coil 108 may be compliant with (e.g., operate in accordance with) a wireless charging standard such as the Qi specification published by the Wireless Power Consortium (e.g., available at wirelesspowerconsortium.com/knowledge-base/specifications/download-the-qi-specifications.html). Wireless charging coil 108 may be mounted to an enclosure assembly directly, mounted to a printed circuit board (e.g., of circuitry 114), mounted battery 116, or other components.

Circuitry 114 may be configured to perform various functions to control operation of mobile computing device 100. For instance, as shown in FIG. 1B, circuitry 114 may be operatively connected to wireless charging coil 108 and battery 116. In operation, circuitry 114 may charge battery 116 using electrical energy received via wireless charging coil 108 and/or cause wireless charging coil 108 to charge an external device using electrical energy stored by battery 116. Examples of circuitry 114 include, but are not limited to, one or more digital signal processors (DSPs), general purpose microprocessors, application specific integrated circuits (ASICs), field programmable logic arrays (FPGAs), systems on a chip (SoC), or other equivalent integrated or discrete logic circuitry, or analog circuitry.

Battery 116 may be capable of storing electrical power and providing the stored electrical power to other components of mobile computing device 100. Examples of battery 116 include, but are not limited to, lithium-ion, a nickel-cadmium, nickel-metal hydride, lead acid, and lithium-ion polymer batteries.

In accordance with one or more aspects of this disclosure, mobile computing device 100 may be configured to preform through-display wireless charging. For instance, wireless charging coil 108 may be configured to perform wireless charging through display 104.

One or more components of mobile computing device 100 may be modified to enable through-display wireless charging. As one example, a section of shielding layer 106 may be cutout. For instance, as shown in FIGS. 1A and 1B, section 112 of shielding layer 106 (e.g., a section overlying wireless charging coil 108) may be cutout, removed, or otherwise not be present. A size of cutout section 112 may be selected based on a size of wireless charging coil 108. For instance, the size (e.g., area) of cutout section 112 may be selected to be the same size, or slightly larger, than a size of wireless charging coil 108. In some examples, decoration may be applied to a rear of display 104 overlying cutout section 112. For instance, the rear of display 104 overlying cutout section 112 may be painted or dyed black or another dark color.

In some examples, despite including cutout section 112, shielding layer 106 may surround cutout section 112. For instance, an interior perimeter of shielding layer 106 may surround wireless charging coil 108. In some examples, by maintaining a perimeter around cutout section 112, shielding layer 106 may provide improved EM/EMI protection. For instance, as charge may typically penetrate from an outer perimeter of display 104, maintaining the perimeter around cutout section 112 may enable shielding layer 106 to still provide adequate EM/EMI protection.

Wireless charging coil 108 may generate heat during operation (e.g., while transducing between electrical power and magnetic fields). However, the heat generated by wireless charging coil 108 may adversely impact operation of other components of mobile computing device 100. For instance, the heat generated by wireless charging coil 108 may adversely impact operation of display 104 (e.g., cause discoloration or other undesirable visual artifacts).

In accordance with one or more aspects of this disclosure, mobile computing device 100 may include a gap, such as air gap 110, between wireless charging coil 108 and display 104. Larger gaps may provide better heat dissipation but may adversely impact a thickness of mobile computing device 100. In some examples, air gap 110 may be at least 100 microns thick. In this way, mobile computing device 100 may perform through-display wireless charging without introducing undesirable visual artifacts.

In operation, an external device, such as external device 102, may be brought into proximity with display 104 of mobile computing device 100. Where mobile computing device 100 operates as a wireless power source, circuitry 114 may utilize electrical power from battery 116 to cause wireless charging coil 108 to generate a magnetic field. The magnetic field may pass through display 104. A wireless charging coil of device 102 may transduce the magnetic field into electrical power, which device 102 may utilize for various operations. Similarly, where mobile computing device 100 operates as a wireless power sink, a wireless charging coil of device 102 may generate a magnetic field which may pass through display 104 and be transduced into electrical power by wireless charging coil 108. Circuity 114 may utilize the electrical power transduced by wireless charging coil 108 to perform various operations, such as charging battery 116.

While described above as a separate component, in some examples, wireless charging coil 108 may be formed from shielding layer 106. In other words, a portion of shielding layer 106 may form wireless charging coil 108. In some examples, shielding layer 106 may be die-cut to form wireless charging coil 108.

Figure 2A:
FIGS. 2A and 2B are schematic diagrams illustrating cross sections of a folding device configured to perform through-display wireless charging, in accordance with one or more aspects of this disclosure.
Figure 2B:
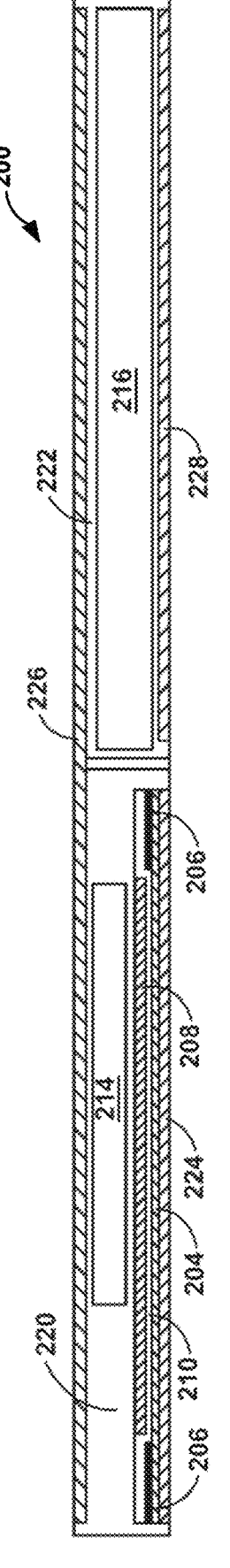

FIGS. 2A and 2B are schematic diagrams illustrating cross sections of a folding device configured to perform through-display wireless charging, in accordance with one or more aspects of this disclosure. FIG. 2A illustrates folding device 200 as fully closed. FIG. 2B illustrates folding device 200 as fully open. Folding device 200 of FIGS. 2A and 2B may be an example of mobile computing device 100 of FIGS. 1A and 1B. Examples of device 200 include foldable mobile computing devices such as foldable smart phones, foldable tablets, foldable e-readers, foldable gaming systems, or any other foldable portable device that includes a display.

As shown in FIGS. 2A and 2B, folding device 200 includes first assembly 220 and second assembly 222. First assembly 220 may be configured to articulate with respect to second assembly 222. Each of first assembly 220 and second assembly 222 may include an inner surface and an outer surface. The outer surface of first assembly 220 may be visible when looking down at device 200 and the outer surface of second assembly 222 may be visible when looking up at device 200. The inner surfaces of first assembly 220 and second assembly 222 may not be externally visible when device 200 is closed.

First assembly 220 may include external display 204, shielding layer 206, wireless charging coil 208, air gap 210, circuitry 214, and cover glass 224. External display 204, shielding layer 206, wireless charging coil 208, circuitry 214, and air gap 210 of device 200 may be examples of display 104, shielding layer 106, wireless charging coil 108, circuitry 114, and air gap 110 of device 100. Cover glass 224 may be a protective layer positioned on top of external display 204. Wireless charging coil 208 may perform wireless charging through both external display 204 and cover glass 224.

Second assembly 222 may include rear cover 228 and battery 216. Battery 216 may be an example of battery 116 of device 100. As first assembly 220 includes wireless charging coil 208, rear cover 228 may be formed out of a metallic material while folding device 200 maintains wireless charging capabilities. Metallic materials may be more durable and/or less expensive that other non-metallic materials that may be used for rear cover 228. As such, by enabling wireless charging through external display 204, this disclosure may enable the use of a more durable and/or less expensive material for rear cover 228. By using more durable materials for rear cover 228, tablets or other larger devices may be capable of performing wireless charging (e.g., as it may not be possible to use non-metallic materials for rear covers of such large devices).

Continuous display 226 may span the inner surfaces of first assembly 220 and second assembly 222. Continuous display 226 may include a flexible section that enables folding device 200 to open and close while continuous display 226 spans between first assembly 220 and second assembly 222. In some examples, continuous display 226 may include a metallic shielding layer (e.g., affixed to a rear of continuous display 226).

In some examples, folding device 200 may include a second wireless charging coil. For instance, second assembly 222 of folding device 200 may include a second wireless charging coil configured to perform wireless charging through an outer surface of second assembly 222. In some of such examples, folding device 200 may not include a display at the outer surface of second assembly 222.

As discussed above, in some examples, battery 216 may be positioned in second assembly 222. As such, wireless charging coil 208 may generate magnetic fields using electrical energy sourced from a battery in a different enclosure (e.g., where wireless charging coil 208 is located in first assembly 220). Positioning battery 216 in a different enclosure than wireless charging coil 208 may provide a benefit in that heat generated by wireless charging coil 208 may not be transmitted to battery 216, which may improve a health and/or a charging time of battery 216.

Figure 3:
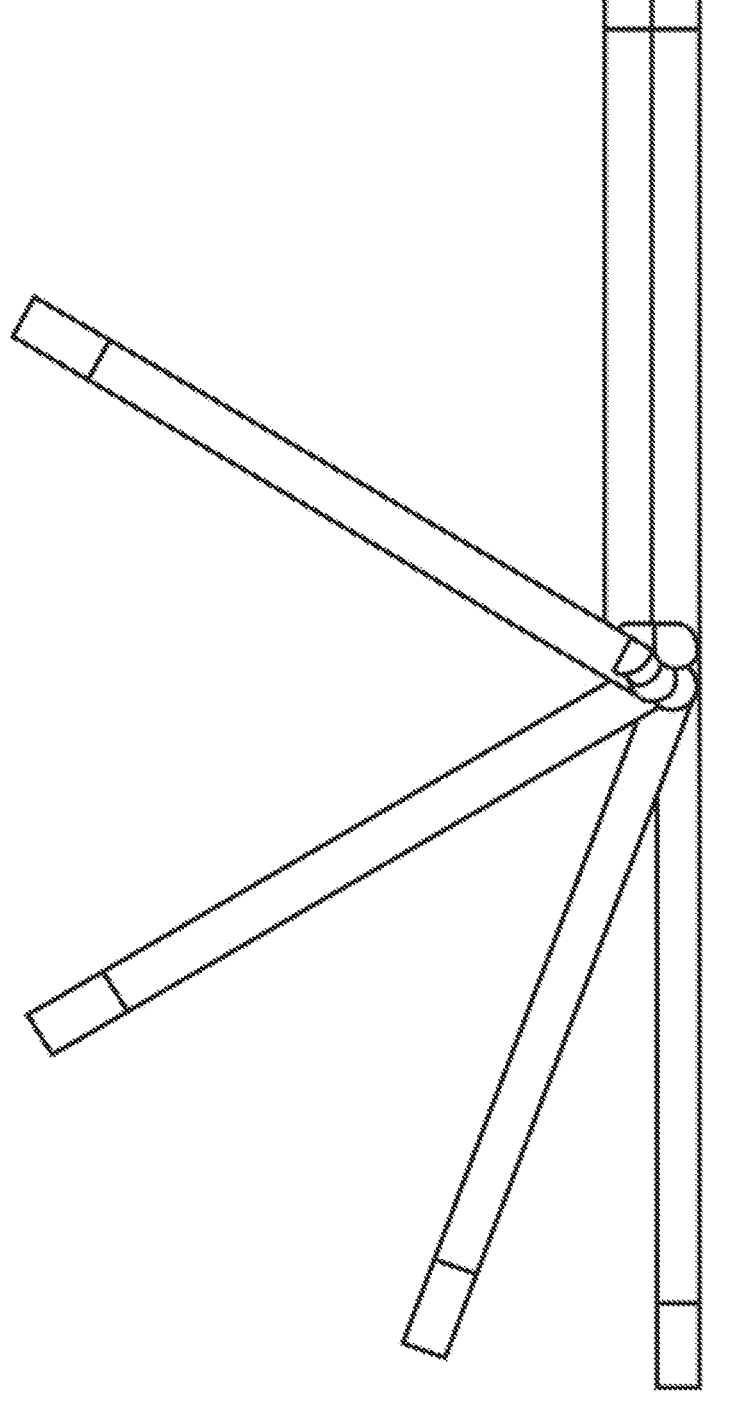
FIG. 3 is a schematic diagram illustrating a folding device in a plurality of folded states, in accordance with one or more aspects of this disclosure.

FIG. 3 is a schematic diagram illustrating a folding device in a plurality of folded states, in accordance with one or more aspects of this disclosure. As can be seen in FIG. 2, at least a portion of a primary flexible segment of a display resides within a hinge assembly while the folding device is closed. As also shown in FIG. 3, when the folding device is fully open, an inner surface of a first assembly is substantially coplanar with an inner surface of a second assembly (e.g., such that a continuous display that spans the first assembly and the second assembly is flat or nearly flat).

Figure 4A:
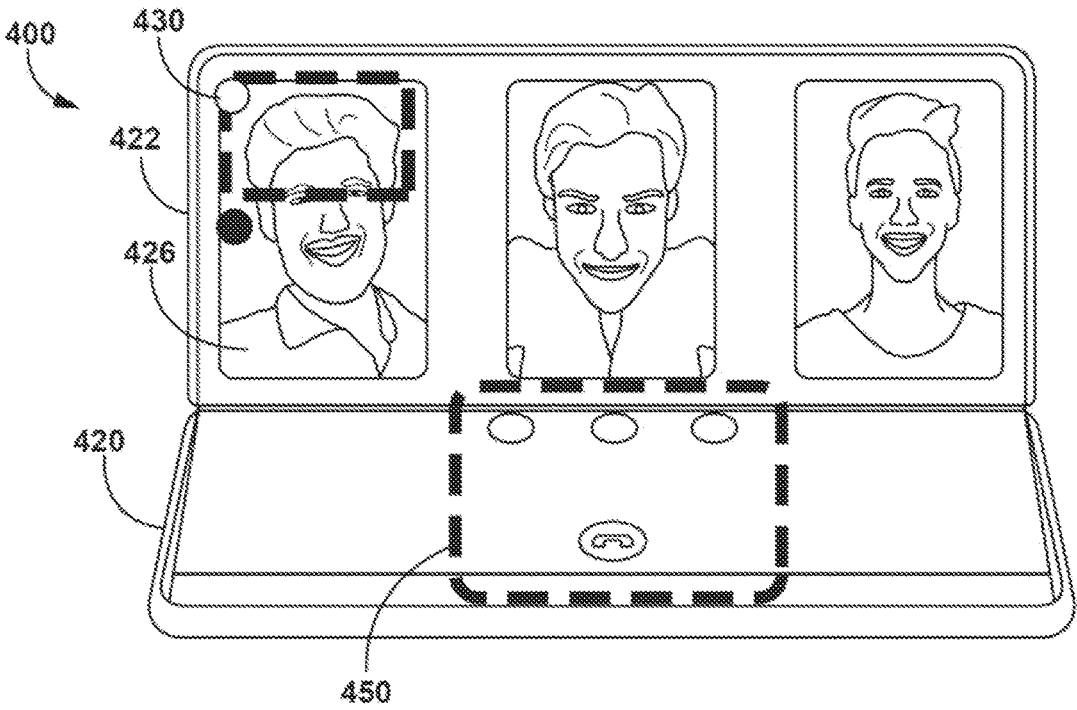
FIGS. 4A-4C are conceptual diagrams illustrating various scenarios in which a folding device performs through-display wireless charging, in accordance with one or more aspects of this disclosure.
Figure 4B:
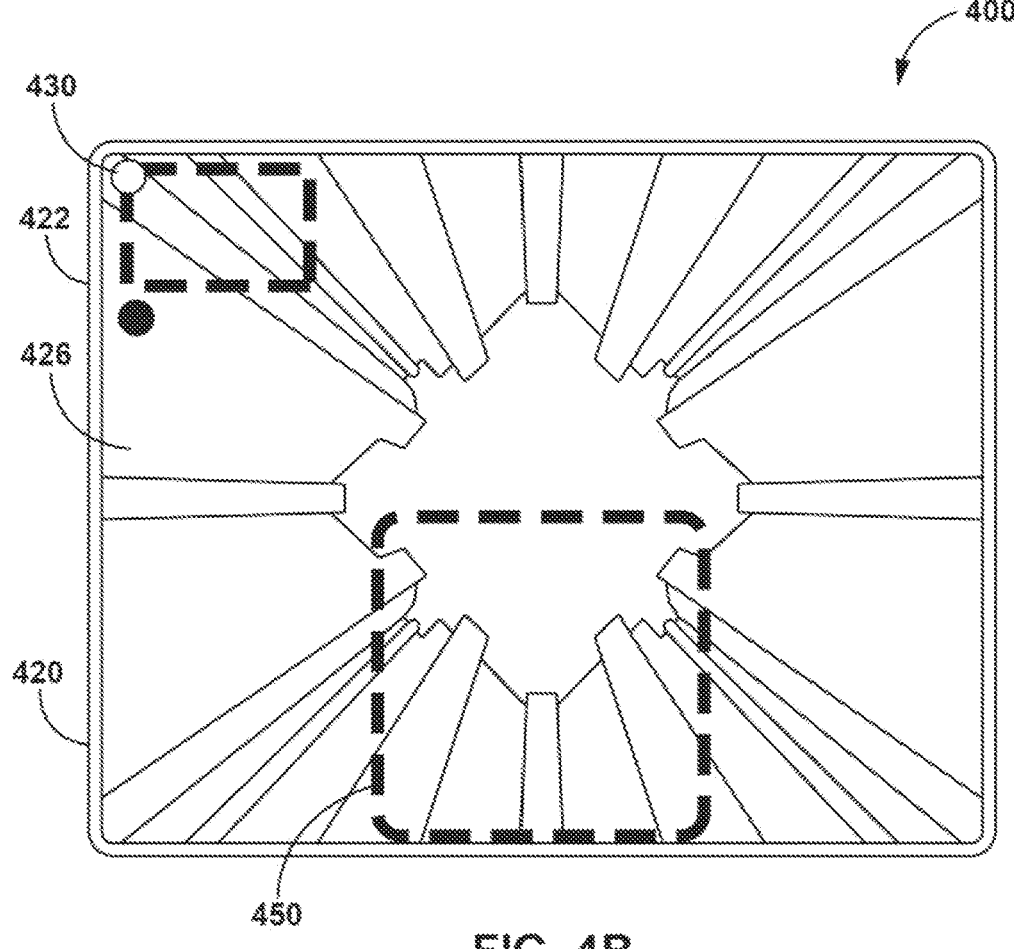
Figure 4C:
Figure 4C:
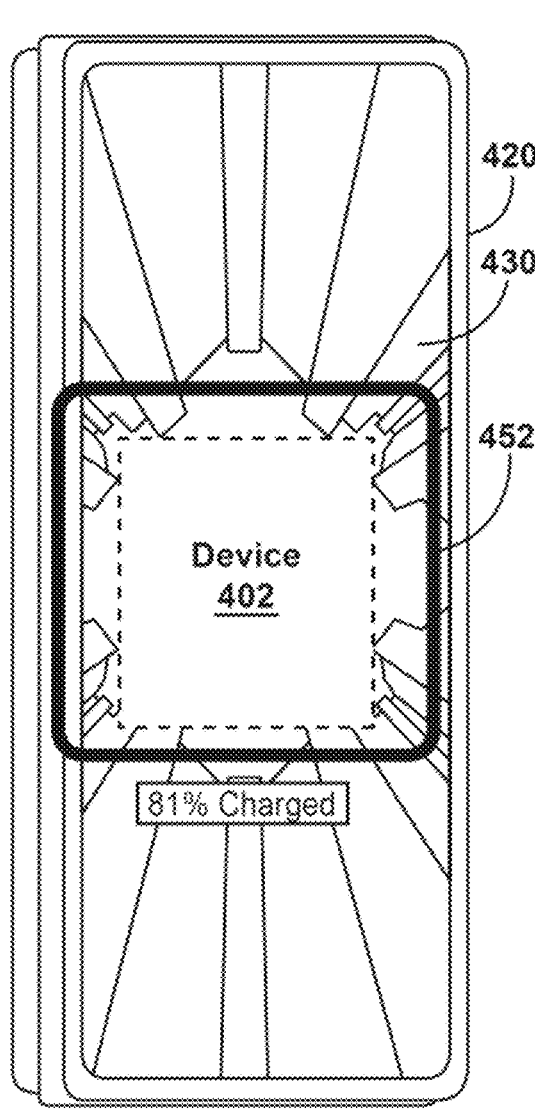

FIGS. 4A-4C are conceptual diagrams illustrating various scenarios in which a folding device performs through-display wireless charging, in accordance with one or more aspects of this disclosure. Folding device 400 of FIGS. 4A-4C may be an example of folding device 200 of FIGS. 2A and 2B. As shown in FIGS. 4A-4C, folding device 400 may include first assembly 420, second assembly 422, and continuous display 426. First assembly 420, second assembly 422, external display 404, and continuous display 426 of folding device 400 may be examples of first assembly 220, second assembly 222, external display 204, and continuous display 226 of folding device 200.

As shown in FIGS. 4A and 4B, folding device 400 may include camera 430 located in second assembly 422. For instance, camera 430 may be located proximate to a corner of continuous display 426 at second assembly 422 (e.g., with an aperture pointed at the inner surface of second assembly 422).

Folding device 400 may be configured to operate in a tabletop mode in which folding device 400 is partially opened (e.g., as shown in FIG. 4A). In the tabletop mode, the position of camera 430 may dictate whether the outer surface of first assembly 420 or the outer surface of second assembly 422 faces down. For instance, where camera 430 is located in second assembly 422, a user may place the outer surface of first assembly face down when using folding device 400 in the tabletop mode (e.g., such that camera 430 is pointed at the user of folding device 400).

When folding device 400 is used in the tabletop mode, an external display of folding device 400 may face down. Dashed line 450 indicates a location of a wireless charging coil on a backside of first assembly 420 (e.g., the wireless charging coil may be closer in proximity to external display 404 than to continuous display 426). As such, in the tabletop mode, folding device 400 may be placed on top of a wireless charging pad. While on the wireless charging pad, folding device 400 may wirelessly receive power from the wireless charging pad (e.g., to charge a battery of folding device 400). For instance, folding device 400 may be placed on the wireless charging pad with external display 404 facing the wireless charging pad and continuous display 426 visible to a user of folding device 400.

Similar to the tabletop mode, while folding device is used in a tablet mode (e.g., FIG. 4B where folding device 400 is fully open), folding device 400 may be placed on top of a wireless charging pad. While on the wireless charging pad, folding device 400 may wirelessly receive power from the wireless charging pad (e.g., to charge a battery of folding device 400).

While folding device is used in a phone mode (e.g., FIG. 4C where folding device 400 is fully closed), folding device 400 may be placed on top of a wireless charging pad or an external device (e.g., external device 402) may be placed on top of folding device 400. Line 452 indicates a location of a wireless charging coil on first assembly 420. While on the wireless charging pad, folding device 400 may wirelessly receive power from the wireless charging pad (e.g., to charge a battery of folding device 400). While the external device is on folding device 400, folding device 400 may wirelessly transmit power to the external device (e.g., to charge a battery of the external device).

Figures 5A, 5B:
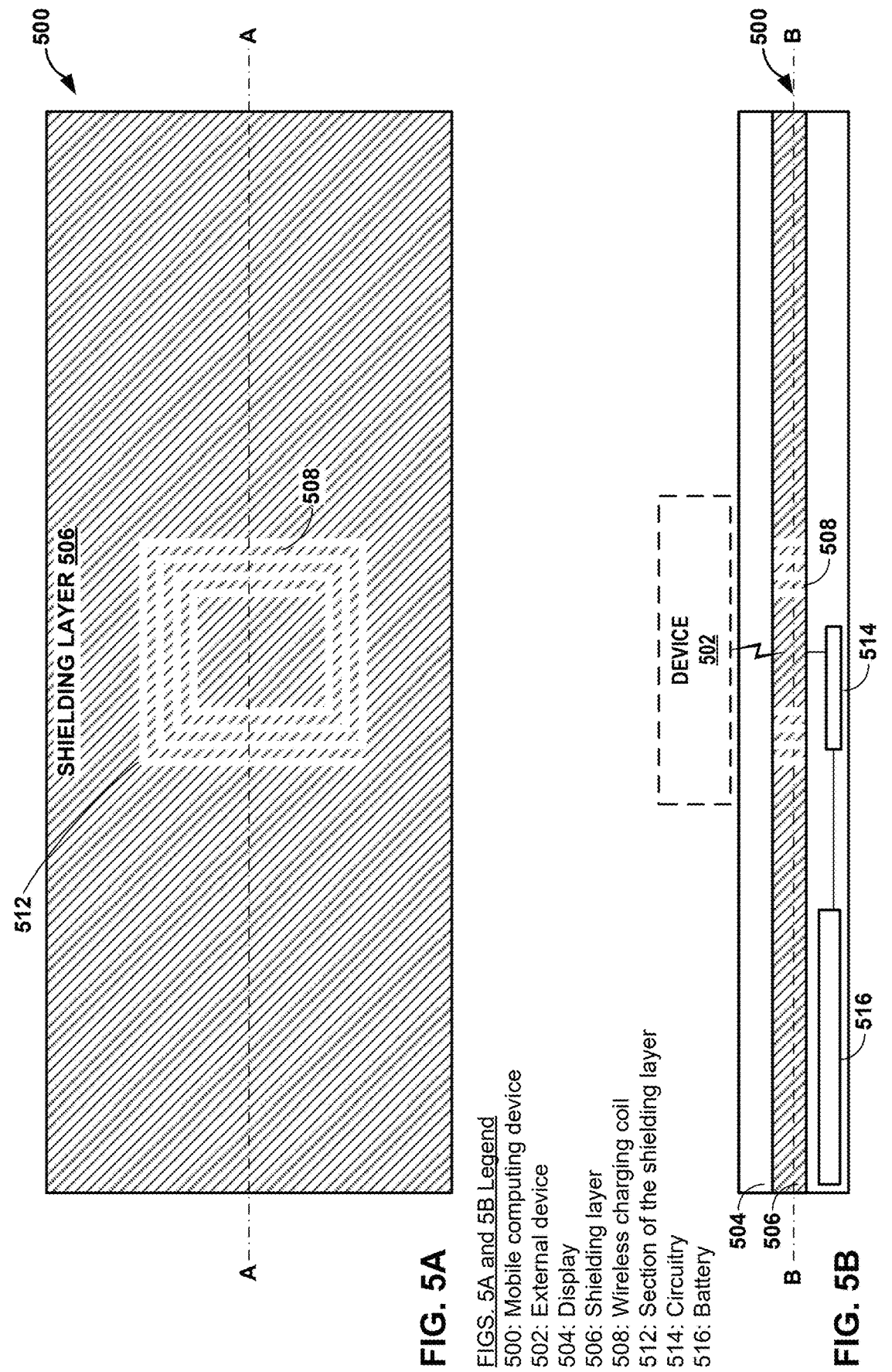
FIGS. 5A and 5B are schematic diagrams illustrating views of a mobile computing device configured to perform through-display wireless charging, in accordance with one or more aspects of this disclosure.

FIGS. 5A and 5B are schematic diagrams illustrating views of a mobile computing device configured to perform through-display wireless charging, in accordance with one or more aspects of this disclosure. FIG. 5A is a top view of mobile computing device 500 cross-sectioned along line B-B. FIG. 5B is a side view of mobile computing device 500 cross-sectioned along line A-A. Device 500 of FIGS. 5A and 5B may be an example of device 100 of FIGS. 1A and 1B, display 504, shielding layer 506, wireless charging coil 508, circuitry 514, and battery 516 of device 500 may be examples of display 104, shielding layer 106, wireless charging coil 108, circuitry 114, and battery 116 of device 100.

As discussed above, in some examples, a portion of a shielding layer of a display may form a wireless charging coil that performs wireless charging through the display. For instance, as shown in FIG. 5A, section 512 of shielding layer 506 may form wireless charging coil 508. Wireless charging coil 508 may be formed from shielding layer 506 using any suitable technique, such as etching, stamping etc. As shown in the example of FIGS. 5A and 5B, the portions of shielding layer 506 that are not removed may form the conductors of wireless charging coil 508.

In some examples, section 512 of shielding layer 506 may be modified to create an air gap between wireless charging coil 508. For instance, section 512 may be compressed or otherwise made thinner than other sections of shielding layer 506.

Figure 6:
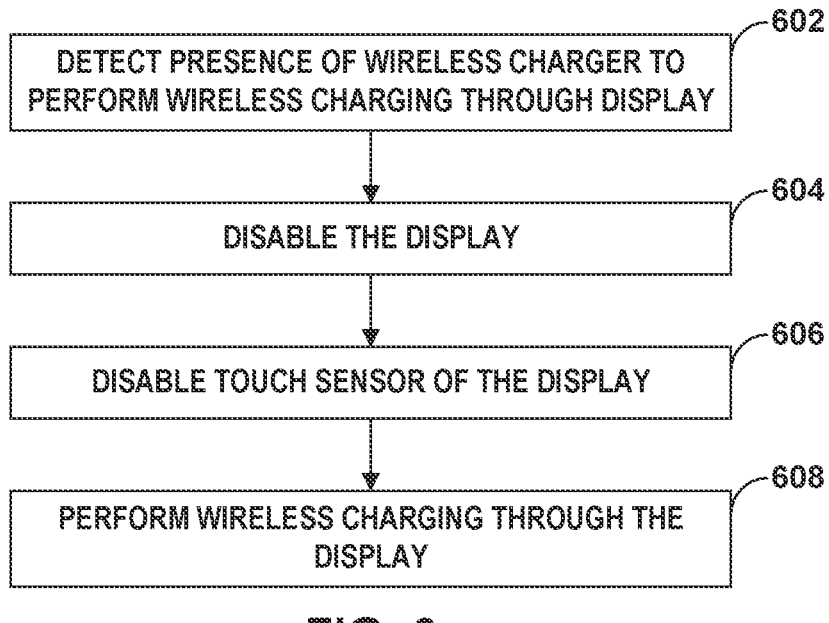
FIG. 6 is a flowchart illustrating an example technique for performing through-display wireless charging, in accordance with one or more aspects of this disclosure.

FIG. 6 is a flowchart illustrating an example technique for performing through-display wireless charging, in accordance with one or more aspects of this disclosure. The technique of FIG. 6 may be performed by one or more processors of a device, such as device 100, 200, or 400.

Device 100 may detect presence of a wireless charger to perform wireless charging through a display (602). For instance, circuitry 114 may detect presence of device 102 in proximity to device 104/wireless charging coil 108 of device 100. As one example, circuitry 114 may detect the presence of device 102 in accordance with the Qi standard.

Device 100 may disable one or more components of display 104 based on an activation state of wireless charging coil 108. For instance, responsive to detecting the presence of device 102 as a wireless charging source (e.g., with device 100 being a wireless charging sink), device 100 may one or both of disable display 104 (604), and disable a touch sensor of display 104 (606). To disable display 104, in some examples, circuitry 114 may deactivate and/or turn-off display 104 such that no images are displayed. To disable the touch sensor of display 104, in some examples, circuitry 114 may deactivate and/or turn-off the touch sensor such that no inputs are detected or disregard inputs that are detected. By deactivating display 104, device 100 may reduce a power consumption of device 100, which may reduce charging time. By deactivating the touch sensor, device 100 may avoid false touch inputs (e.g., as it is unlikely that inputs would be received while device 100 is charging face-down).

Device 100 may perform wireless charging through the display (608). For instance, device 102 may generate a magnetic field that passes through display 104 to wireless charging coil 108, which may transduce the magnetic field into electrical power. Circuitry 114 may charge a battery of device 100 using the electrical power. After performance of wireless charging is complete, device 100 may re-enable the display and/or the touch sensor.

Figure 7:
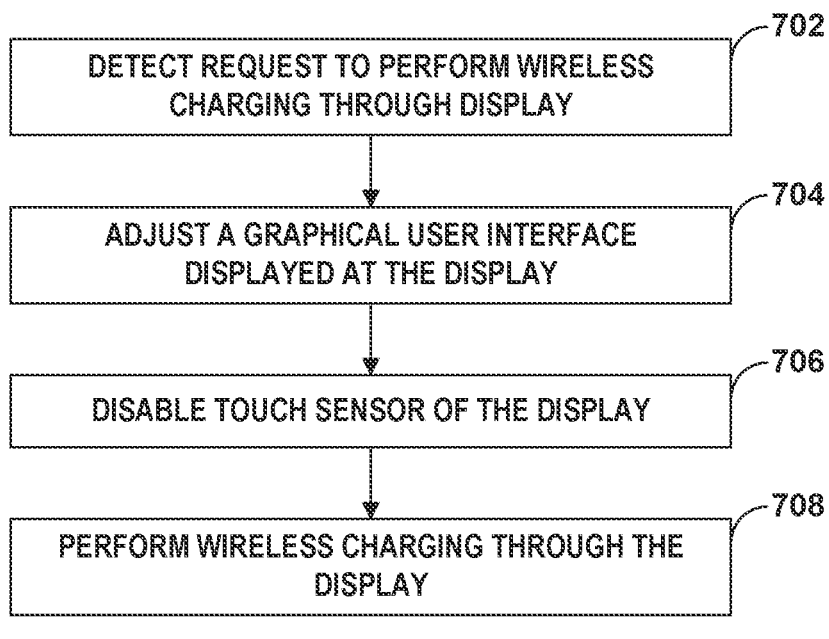
FIG. 7 is a flowchart illustrating an example technique for performing through-display wireless charging, in accordance with one or more aspects of this disclosure.

FIG. 7 is a flowchart illustrating an example technique for performing through-display wireless charging, in accordance with one or more aspects of this disclosure. The technique of FIG. 7 may be performed by one or more processors of a device, such as device 100, 200, or 400.

Device 100 may detect a request to perform wireless charging through a display (702). For instance, circuitry 114 may detect presence of device 102 in proximity to device 104/wireless charging coil 108 of device 100. As one example, circuitry 114 may detect the presence of device 102 in accordance with the Qi standard.

Device 100 may adjust operation of one or more components of display 104 based on an activation state of wireless charging coil 108. For instance, responsive to detecting the presence of device 102 as a wireless charging source (e.g., with device 100 being a wireless charging sink), device 100 may adjust a graphical user interface (GUI) displayed at the display (704), and disable a touch sensor of display 104 (706). To adjust the GUI, in some examples, circuitry 114 may deactivate and/or turn-off pixels overlying charging coil 108 such that no images are displayed at said pixels. To disable the touch sensor of display 104, in some examples, circuitry 114 may deactivate and/or turn-off the touch sensor such that no inputs are detected or disregard inputs that are detected.

In addition to, or in place of, deactivating the pixels that overlie wireless charging coil 108, circuitry 114 may adjust the GUI by displaying visual elements that indicate a charge level of device 102. For instance, as shown in FIG. 4C, device 400 may display an indication that device 402 is 81% Charged.

Device 100 may perform wireless charging through the display (708). For instance, circuitry 114 may cause wireless charging coil 108 to generate a magnetic field that passes through display 104 to device 102, which may transduce the magnetic field into electrical power. After performance of wireless charging is complete, device 100 may re-enable the display and/or the touch sensor.

The following numbered examples may illustrate one or more aspects of this disclosure:

Example 1. A mobile computing device comprising: a display; a battery; a wireless charging coil positioned to wirelessly transmit or receive electrical energy through the display; and circuitry configured to charge the battery using electrical energy received via the wireless charging coil.

Example 2. The mobile computing device of example 1, further comprising a metallic shielding layer affixed to the display, the metallic shielding layer including a cutout section overlying the wireless charging coil.

Example 3. The mobile computing device of example 2, wherein a perimeter of the metallic shielding layer surrounds the cutout section.

Example 4. The mobile computing device of any of examples 1-3, wherein the wireless charging coil is positioned within the mobile computing device such that there is a gap between the wireless charging coil and the display.

Example 5. The mobile computing device of example 4, wherein the gap between the wireless charging coil and the display is at least 100 microns.

Example 6. The mobile computing device of example 1, further comprising a metallic shielding layer affixed to the display, and wherein a portion of the metallic shielding layer forms the wireless charging coil.

Example 7. The mobile computing device of any of examples 1-6, wherein the mobile computing device comprises a folding device, the folding device further comprising: a first assembly having an inner and an outer surface; a second assembly having an inner and an outer surface, wherein, when the folding device is fully opened, the inner surface of the first assembly is substantially coplanar with the inner surface of the second assembly, wherein the display is an additional display positioned on the outer surface of the first assembly, the folding device further comprising: a continuous display positioned on the inner surface of the first assembly and the inner surface of the second assembly.

Example 8. The mobile computing device of example 7, wherein the continuous display comprises a metallic shielding layer.

Example 9. The mobile computing device of example 7 or example 8, wherein the second assembly includes a camera with an aperture positioned at the inner surface of the second assembly.

Example 10. The mobile computing device of example 9, wherein the folding device is configured to operate in a tabletop mode in which the folding device is partially opened with the outer surface of the first assembly faces down.

Example 11. The mobile computing device of any of examples 7-10, wherein the wireless charging coil is a first wireless charging coil, the folding device further comprising: a second wireless charging coil positioned within the second assembly and configured to wirelessly transmit or receive electrical energy through the outer surface of the second assembly.

Example 12. The mobile computing device of any of examples 7-11, wherein the second assembly does not include a display at the outer surface of the second assembly.

Example 13. The mobile computing device of any of examples 7-12, wherein the battery is positioned in the second assembly.

Example 14. The mobile computing device of any of examples 1-13, wherein the circuitry is further configured to: disable one or more components of the display based on an activation state of the wireless charging coil.

Example 15. The mobile computing device of any of examples 1-14, wherein the circuitry is further configured to: adjust a graphical user interface displayed at the display based on an activation state of the wireless charging coil.

Example 16. A method for performing through-display wireless charging, the method comprising: responsive to detecting, by a device, presence of an external device to perform wireless charging through a display of the device; adjusting, by the device, operation of the display; and performing, by a wireless charging coil of the device that is located under the display, wireless charging through the display.

Example 17. The method of example 16, wherein the device comprises a wireless charging sink device, and wherein adjusting operation of the display comprises: disabling the display; and disabling a touch sensor of the display.

Example 18. The method of example 16, wherein the device comprises a wireless charging source device, and wherein adjusting operation of the display comprises: disabling pixels of the display that overlie the wireless charging coil; and disabling a touch sensor of the display.

Example 19. The method of example 18, wherein adjusting operation of the display comprises: adjusting a graphical user interface displayed at the display.

Example 20. The method of example 19, wherein adjusting the graphical user interface displayed at the display comprises: displaying visual elements that indicate a charge level of the external device.

Example 21. A non-transitory computer readable storage medium storing instructions that, when executed, cause circuitry of a mobile computing device to perform the method of any of examples 16-20.

Various aspects have been described in this disclosure. These and other aspects are within the scope of the following claims.

The invention claimed is:

1. A folding mobile computing device comprising:
a first assembly having an inner and an outer surface;
a second assembly having an inner and an outer surface, wherein, when the folding device is fully opened, the inner surface of the first assembly is substantially coplanar with the inner surface of the second assembly;
an outer display positioned on the outer surface of the first assembly;
a continuous display positioned on the inner surface of the first assembly and the inner surface of the second assembly;
a battery positioned in the second assembly;
a wireless charging coil positioned to wirelessly transmit or receive electrical energy through the outer display;
a metallic shielding layer affixed to a back surface of the outer display, the metallic shielding layer including a cutout section overlying the wireless charging coil, wherein the wireless charging coil is positioned within the mobile computing device such that there is a gap between the wireless charging coil and the back surface of the outer display; and
circuitry configured to:
charge the battery using electrical energy received via the wireless charging coil; and
disable a touch sensor and one or more pixels of the display based on an activation state of the wireless charging coil.

2. The folding mobile computing device of claim 1, wherein the gap between the wireless charging coil and the outer display is at least 100 microns.

3. The folding mobile computing device of claim 1, wherein the second assembly includes a camera with an aperture positioned at the inner surface of the second assembly.

4. The folding mobile computing device of claim 3, wherein the folding device is configured to operate in a tabletop mode in which the folding device is partially opened with the outer surface of the first assembly is face down.

5. The folding mobile computing device of claim 1, wherein the wireless charging coil is a first wireless charging coil, the folding device further comprising:
a second wireless charging coil positioned within the second assembly and configured to wirelessly transmit or receive electrical energy through the outer surface of the second assembly.

6. The folding mobile computing device of claim 1, wherein the second assembly does not include a display at the outer surface of the second assembly.

7. The folding mobile computing device of claim 1, wherein the circuitry is further configured to:
adjust a graphical user interface displayed at the outer display based on an activation state of the wireless charging coil.

* * * * *